D. Witt.

Clod Crusher.

Nº 86,893. Patented Feb. 9, 1869.

Witnesses:
Geo. J. Rothwell
Jacob F. Henry

Inventor:
Daniel Witt

DANIEL WITT, OF HUBBARDSTON, MASSACHUSETTS.

*Letters Patent No. 86,893, dated February 9, 1869.*

IMPROVEMENT IN COMBINED BREAKER AND LEVELLER.

The Schedule referred to in these Letters Patent and making part of the same.

*To all whom it may concern:*

Be it known that I, DANIEL WITT, of Hubbardston, in the county of Worcester, and State of Massachusetts, have invented a new and useful Combined Breaker and Leveller; and I do hereby declare the following to be a full, clear, and exact description of the same, sufficient to enable others skilled in the art to which my invention appertains, to fully understand and use the same, reference being had to the accompanying drawings, which are made part of this specification, and in which—

Similar letters of reference indicate corresponding parts in the several figures.

Figure 1:
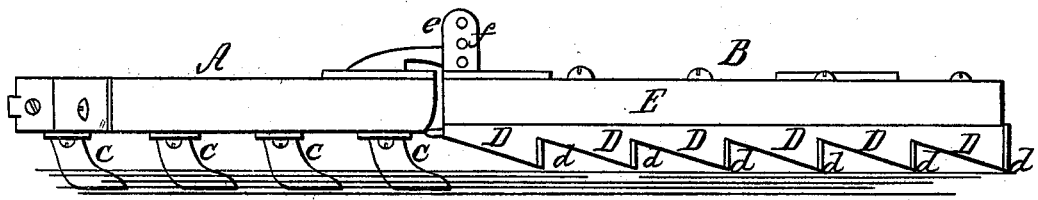
Figure 1 is a side view of the device illustrating my invention.

My invention consists in the novel construction of the teeth of the "breaker," whereby the earth is broken and raised, but not overturned.

It also consists in so combining the breaker with the leveller that one or both may be used, as desired or found necessary, as will be hereinafter more fully described.

In the drawings—

A represents the breaker, and

B, the leveller.

The breaker consists of a suitable frame-work, by preference of V-shape, and having secured thereto, on its under side, in suitable manner, a series of breaker-teeth, C.

Each tooth consists of a shank, *a*, and wings, *b*.

The shank has a cutting-edge, which curves to the rear for a proper distance, and then joins the wings, which are a continuation of said shank. Each has its front edge slightly curved to the rear, and each face is inclined toward the front edge.

It will be seen that when the teeth enter the ground they merely raise and break the clods, without overturning them.

A suitable clevis is secured to the front part of the frame-work, for attachment to the animal which draws the device.

The leveller B is constructed of a series of blocks or pieces, D, of the form of right-angle triangles, whose bases are vertically parallel to each other, so that a series of teeth are presented to the ground.

Each base has secured to it a metallic strip or plate, *d*, or a strip of wood which is stronger or harder than that of the blocks D.

When the leveller is drawn forward, the hypothenuses of the blocks successively pass over the ground, and, while assisting to break the clods, level the surface thereof gradually and uniformly.

The blocks D are retained together by longitudinal bars, E, or any other suitable means.

Hooks, eyes, or other equivalent devices, are connected to the leveller, to afford attachment to the harness of the animals.

Figure 2:
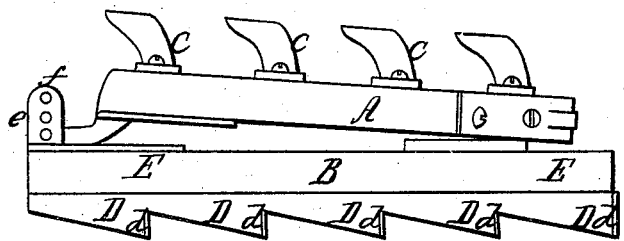
Figure 2 is a similar view, showing the parts in a folded position.
Figure 3:
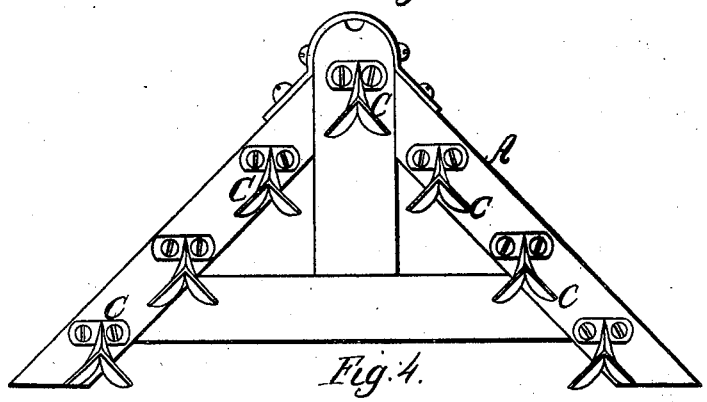
Figure 3 is a bottom view of the "breaker."
Figure 4:
Figure 4 is a front view of one of the teeth of the breaker.

The breaker and leveller are hinged together, as at *c*, in such a manner as to allow the breaker to be swung over and rest upon the leveller, as seen in fig. 2, and *vice versa.*

The leaves or ears *f* of the hinges are made adjustable, in order to regulate the depth to which the teeth C should penetrate.

When the two-part device is extended, as in fig. 1, the ground is raised, broken, and levelled. When the ground is to be only raised and broken, then the leveller is swung on the breaker; but when it is already broken, and only requires levelling, then the breaker is swung on the leveller.

When clods are overturned, by the old form of teeth, the ground is but little broken; but by my form of teeth it is raised and broken, without packing, so that the particles lie loosely on each other, and allow the admission of air before and after the levelling process.

Having thus fully described my invention,

What I claim as new, and desire to secure by Letters Patent, is—

1. The adjustable leaves or ears *f* of the hinge *e*, in combination with the breaker A and leveller B, substantially as and for the purpose described.

2. The breaker A, with teeth C, as described, and leveller B, with triangular blocks D, as described, when constructed and combined to operate in the manner and for the purpose specified.

The above signed by me, this 17th day of December, 1868.

DANIEL WITT.

Witnesses:
JOHN A. WIEDERSHEIM,
GEO. A. ROTHWELL.